US011584524B2

(12) United States Patent
Regev

(10) Patent No.: US 11,584,524 B2
(45) Date of Patent: Feb. 21, 2023

(54) UNMANNED AERIAL VEHICLE

(71) Applicants: Eyal Regev, Mazkeret Batya (IL); GADFIN LTD., Rehovot (IL)

(72) Inventor: Eyal Regev, Mazkeret Batya (IL)

(73) Assignees: GADFIN LTD., Rehovot (IL); Eyal Regev, Mazkeret Batya (IL)

( * ) Notice: Subject to any disclaimer, the term of this patent is extended or adjusted under 35 U.S.C. 154(b) by 322 days.

(21) Appl. No.: 16/635,010

(22) PCT Filed: Aug. 2, 2018

(86) PCT No.: PCT/IL2018/050860
§ 371 (c)(1),
(2) Date: Jan. 29, 2020

(87) PCT Pub. No.: WO2019/026079
PCT Pub. Date: Feb. 7, 2019

(65) Prior Publication Data
US 2020/0239137 A1      Jul. 30, 2020

Related U.S. Application Data

(60) Provisional application No. 62/540,075, filed on Aug. 2, 2017.

(51) Int. Cl.
*B64C 39/02*      (2006.01)
*B64C 3/56*       (2006.01)
(Continued)

(52) U.S. Cl.
CPC .............. *B64C 39/024* (2013.01); *B64C 3/56* (2013.01); *B64C 13/34* (2013.01); *B64C 13/50* (2013.01);
(Continued)

(58) Field of Classification Search
CPC ................ B64C 3/56; B64C 3/40; B64C 3/38
See application file for complete search history.

(56) References Cited

U.S. PATENT DOCUMENTS 8,393,564 B2 *   3/2013   Kroo ................... B64C 29/0025
                                                                244/6
9,545,991 B1     1/2017   Alley et al.
(Continued)

FOREIGN PATENT DOCUMENTS

CN     202208367 U     5/2012
CN     205707297 U     11/2016
(Continued)

OTHER PUBLICATIONS

An office action from the Indian patent office in a counterpart foreign application—India 202037006785—dated Nov. 3, 2021; 7 pages.
(Continued)

*Primary Examiner* — Timothy D Collins
*Assistant Examiner* — Eric Acosta
(74) *Attorney, Agent, or Firm* — Roach Brown McCarthy & Gruber, P.C.; Kevin D. McCarthy

(57) ABSTRACT

A hybrid aerial vehicle (HAV) comprising: a fuselage of the HAV; a first mechanism within the fuselage for accepting a plurality of wings of the HAV, the first mechanism allowing coordinated contraction of the plurality of wings essentially into the fuselage such that tips of the wings are position in proximity of the fuselage and coordinated extension of the wings such that tips of each wing are positioned away from the fuselage; a first wing extending from the port side of the fuselage and connected to the first mechanism; a second wing extending from the starboard side of the fuselage and connected to the first mechanism; a second mechanism placed within the fuselage in proximity to its front end, the second mechanism allowing motion of propellers of the
(Continued)

HAV affixed there to between a first plain and a second plain; a first set of propellers affixed at the port side of the fuselage to the second mechanism; a second set of propellers affixed at the starboard side of the fuselage to the second mechanism; a third mechanism placed within the fuselage in proximity to its rear end, the third mechanism allowing motion of propellers of the HAV affixed there to between a first plain and a second plain, and further placing the propellers affixed thereto to be at a vertical displacement with respect to the propellers affixed to the second mechanism; a third set of propellers affixed at the port side of the fuselage to the third mechanism; and a fourth set of propellers affixed at the starboard side of the fuselage to the third mechanism.

7 Claims, 11 Drawing Sheets

(51) Int. Cl.
  *B64C 13/34* (2006.01)
  *B64C 13/50* (2006.01)
  *B64C 29/00* (2006.01)
(52) U.S. Cl.
  CPC ...... *B64C 29/0033* (2013.01); *B64C 2201/02* (2013.01)

(56) References Cited

U.S. PATENT DOCUMENTS

| | | |
|---|---|---|
| 2012/0234968 A1 | 9/2012 | Smith |
| 2012/0261523 A1 | 10/2012 | Shaw |
| 2014/0151496 A1 | 6/2014 | Shaw |
| 2015/0183528 A1 | 7/2015 | Walsh et al. |
| 2016/0347446 A1 | 12/2016 | Vetter et al. |
| 2017/0158353 A1 | 6/2017 | Schmick |

FOREIGN PATENT DOCUMENTS

| | | |
|---|---|---|
| CN | 106494608 A1 | 3/2017 |
| CN | 106 882 365 A | 6/2017 |
| DE | 203 16 236 U1 | 2/2004 |
| EP | 2048096 A1 | 4/2009 |
| EP | 2 733 066 A1 | 5/2014 |
| GB | 2 544 657 A | 5/2017 |
| KR | 2016 0121199 A | 10/2016 |
| KR | 101688951 B1 | 12/2016 |
| WO | 2016/130847 A1 | 8/2016 |
| WO | 2016/196277 A1 | 12/2016 |

OTHER PUBLICATIONS

International Search Report for PCT/IL2018/050860, dated Jan. 14, 2019; 5 pages.
Written Opinion of the International Searching Authority for PCT/IL2018/050860, dated Jan. 14, 2019; 6 pages.
Communication and Supplemental Partial European Search Report for European patent application No. EP 18 84 2298, dated Apr. 12, 2021 (16 pages).
Communication and Supplementary European Search Report for EP 18 84 2298, dated Jul. 9, 2021; 17 pages.
Communication and Supplementary European Search Report for EP 18 84 2298, dated Apr. 12, 2021; 16 pages.
Office action from the Chinese patent office in a counterpart foreign application—China 2018800505661—dated Nov. 2, 2022; 7 pages; and an English machine translation (4 pages).

* cited by examiner

UNMANNED AERIAL VEHICLE

CROSS REFERENCE TO RELATED APPLICATIONS

This application claims the benefit of U.S. provisional application No. 62/540,075 filed on Aug. 2, 2017, which is incorporated herein by reference.

TECHNICAL FIELD

The disclosure generally relates to unmanned aerial vehicles (UAVs), and more specifically to a hybrid aerial vehicle (HAV) and systems related thereto.

BACKGROUND

An unmanned aerial vehicle (UAV), commonly known as a drone, is an aircraft without a human pilot aboard. In many cases the UAV's flight is controlled autonomously by onboard control unit. UAVs are used for many commercial and civil purposes including deliveries, filming video clips and images, security missions, etc. Currently UAVs have become common place but still have various deficiencies some of which are solved by the inventions described.

In particular, a UAV in a Vertical Take-off and Landing (VTOL) configuration, enables a variety of capabilities. However, the deficiencies of the prior art encounter low performance and low reliability.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some or certain embodiments may be used herein to refer to a single embodiment or multiple embodiments of the disclosure.

Certain embodiments disclosed herein include a hybrid aerial vehicle (HAV) comprising: a fuselage of the HAV; a first mechanism within the fuselage for accepting a plurality of wings of the HAV, the first mechanism allowing coordinated contraction of the plurality of wings essentially into the fuselage such that tips of the wings are position in proximity of the fuselage and coordinated extension of the wings such that tips of each wing are positioned away from the fuselage; a first wing extending from the port side of the fuselage and connected to the first mechanism; a second wing extending from the starboard side of the fuselage and connected to the first mechanism; a second mechanism placed within the fuselage in proximity to its front end, the second mechanism allowing motion of propellers of the HAV affixed there to between a first plain and a second plain; a first set of propellers affixed at the port side of the fuselage to the second mechanism; a second set of propellers affixed at the starboard side of the fuselage to the second mechanism; a third mechanism placed within the fuselage in proximity to its rear end, the third mechanism allowing motion of propellers of the HAV affixed there to between a first plain and a second plain, and further placing the propellers affixed thereto to be at a vertical displacement with respect to the propellers affixed to the second mechanism; a third set of propellers affixed at the port side of the fuselage to the third mechanism; and a fourth set of propellers affixed at the starboard side of the fuselage to the third mechanism.

BRIEF DESCRIPTION OF THE DRAWINGS

The subject matter that is regarded as the disclosure is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1A:
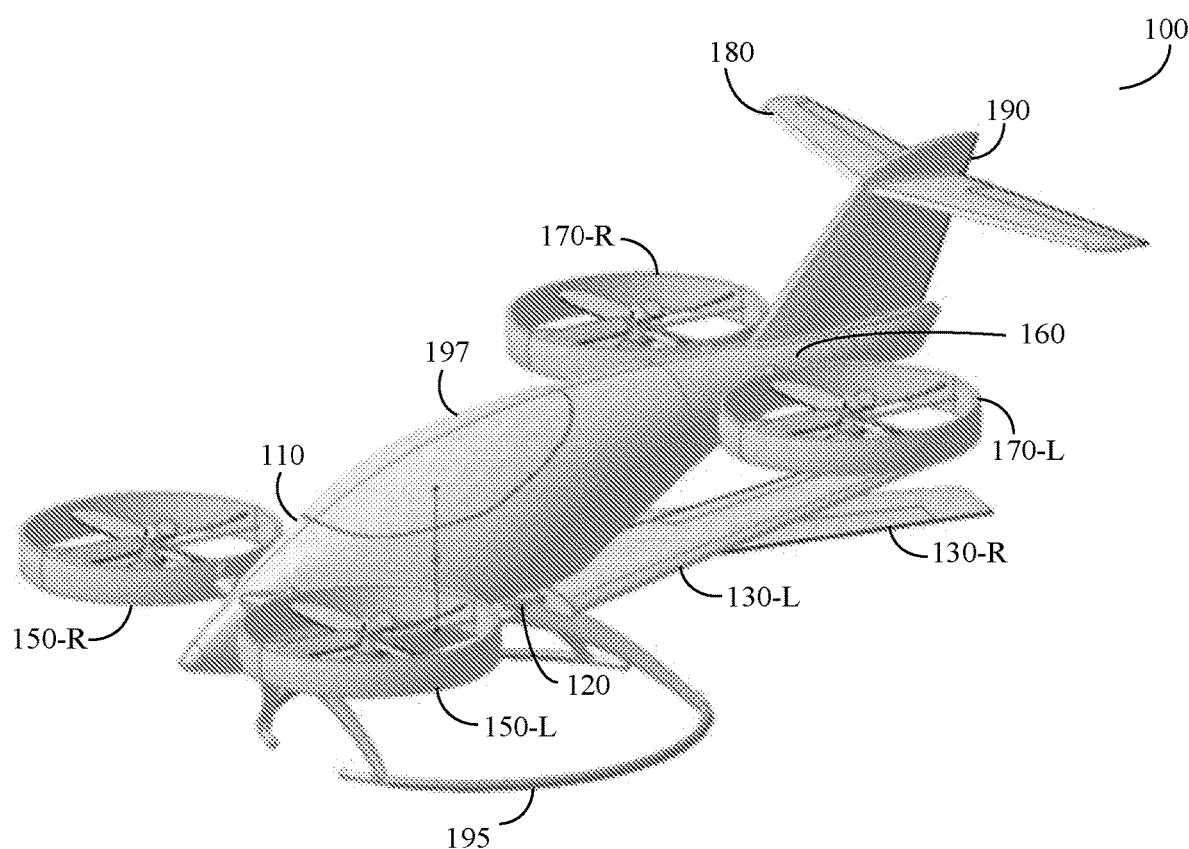
FIG. 1A—is a schematic diagram of a hybrid aerial vehicle (HAV) according to an embodiment.

It is important to note that the embodiments disclosed by the disclosure are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

FIG. 1A shows an exemplary and non-limiting schematic diagram of a hybrid aerial vehicle (HAV) 100 according to an embodiment. The HAV 100 includes a fuselage 110 that comprises a first mechanism 120 for accepting a first wing 130-L that is extended from a port side of the fuselage 110 and connected to the first mechanism 120, and a second wing 130-R that is extended from a starboard side of the fuselage 110 and connected to the first mechanism 120. The first mechanism 120 allows coordinated contraction of the first wing 130-L and the second wing 130-R essentially into the fuselage 110 such that tips of the wings 130 are positioned in proximity of the fuselage 110 and coordinated extension of the wings 130 such that tips of each wing 130 are positioned away from the fuselage 110. The first mechanism 120 is further described with respect of FIG. 5.

The HAV 100 further comprises a second mechanism (not shown) placed within the fuselage 110 in proximity to a front end of the fuselage 110. The second mechanism allows motion of propellers 150 of the HAV 100 affixed there to between a first plain and a second plain. The first plain may be for example a horizontal position, and the second plain may be for example a vertical position. According to an embodiment the second mechanism may cause the propellers 150 to be positioned in a plurality of positions between the first plain and the second plain. In an embodiment, the second mechanism may include two different mechanisms such as a mechanism-R affixed to the starboard side of the fuselage 110 and a mechanism-L affixed to the starboard side of the fuselage 110, when each of them may have an independent angle.

The second mechanism may, for example and not by way of limitation, place the propellers 150 in 90, 60, 45, 30, 15 and 0 degrees angles, or any angle between the specified, with respect to the ground. The propellers 150 include a first set of propellers 150-L affixed at the port side of the fuselage 110 to the second mechanism and a second set of propellers 150-R affixed at the starboard side of the fuselage 110 to the second mechanism. Each of the first set of propellers 150-R and the second set of propellers 150-L may include, for example, two sets of propellers.

The HAV 100 further comprises a third mechanism (not shown) placed within the fuselage 110 in proximity to a rear end of the fuselage 110. The third mechanism allows motion of a plurality of propellers 170 of the HAV 100 affixed there to between a first plain and a second plain. That is to say, the first plain may be for example a horizontal position, and the second plain may be for example a vertical position. According to an embodiment the third mechanism may cause the propellers 170 to be positioned in a plurality of mid-range positions between the first plain and the second plain. For example, the third mechanism 160 may place the propellers 170 in 90, 60, 45, 30, 15 and 0 degrees angles, or any angle between the specified, with respect to the ground. In an embodiment, the third mechanism may include two different mechanisms such as a mechanism-R affixed to the starboard side of the fuselage 110 and a mechanism-L affixed to the starboard side of the fuselage 110, when each of them may have an independent angle.

The third mechanism places the plurality of propellers 170 affixed thereto to be at a vertical displacement with respect to the propellers 150 affixed to the second mechanism. That is to say, the propellers 150 affixed to the second mechanism are placed in a different vertical position with respect to the vertical position at which the propellers 170 are placed. The plurality of propellers 170 include a third set of propellers 170-L affixed at the port side of the fuselage 110 to the third mechanism, and a fourth set of propellers 170-L affixed at the starboard side of the fuselage 110 to the third mechanism.

The HAV 100 may further include a horizontal stabilizer 180. The horizontal stabilizer 180 may be affixed to a vertical stabilizer 190 that is affixed to the rear end of the fuselage 110. The horizontal stabilizer 180 is designed to keep the HAV 100 stabilize during the flight. The HAV 100 may further include a set of landing skids 195 affixed to a bottom side of the fuselage 110. The landing skids 195 allow the HAV 100 to land in different locations. In an embodiment, the HAV 100 comprises at least one internal cargo pod 197 at which cargo, i.e., delivery items may be stored. The HAV 100 may include at least one hatch related to the at least one internal cargo pod 197. The hatch may be affixed to the bottom side of the HAV 100 and designed to allow access to the items stored within the at least one internal cargo pod 197.

According to one embodiment, the HAV 100 comprises a control unit (not shown) designed to control the operation of the components of the HAV 100. For example, the control unit may be configured to spread the wings 130, fold the wings 130, activate the propellers 150 and the propellers 170, changing the position of the propellers as further described herein above, etc.

According to one embodiment, this disclosure enables enhanced flight capabilities by increasing the flight speed and flight duration, consuming less energy, etc. During takeoff in a folded wings position, the HAV 100 is able to achieve faster vertical takeoff as the wings 130 are not interrupting the HAV 100 to move rapidly upwards. Furthermore, the HAV 100 folding wings allow it to land at crowded areas. In addition, the HAV 100 folding wings allow the HAV 100 to tolerate significant fluctuations as the wings are safe within the fuselage 110 such that the wings cannot be damaged by the ground while the HAV 100 experiences wing turbulence at takeoff and landing. However, the folding wings mechanism still allows the HAV 100 to have long wings that enables lower energy consumption during flight, thus allowing the HAV 100 to reach longer distances. The folding wings mechanism allows the HAV 100 to be shipped on a regular track, ship container, small cargo planes, etc. without the need to dismantle the wings. When the HAV 100 passes a certain predetermined altitude, speed, a combination thereof, etc. the control unit (not shown) causes the wings 130 to spread. The flight control unit then speeds the HAV 100 to forward flight until it passes a predetermined speed, e.g., velocity beyond stall (Vstall). After passing the predetermined speed, the flight control unit commands the propellers to switch to a vertical position with respect to the ground in order to improve the HAV's 100 flight speed, consume less energy, etc.

Figure 1B:
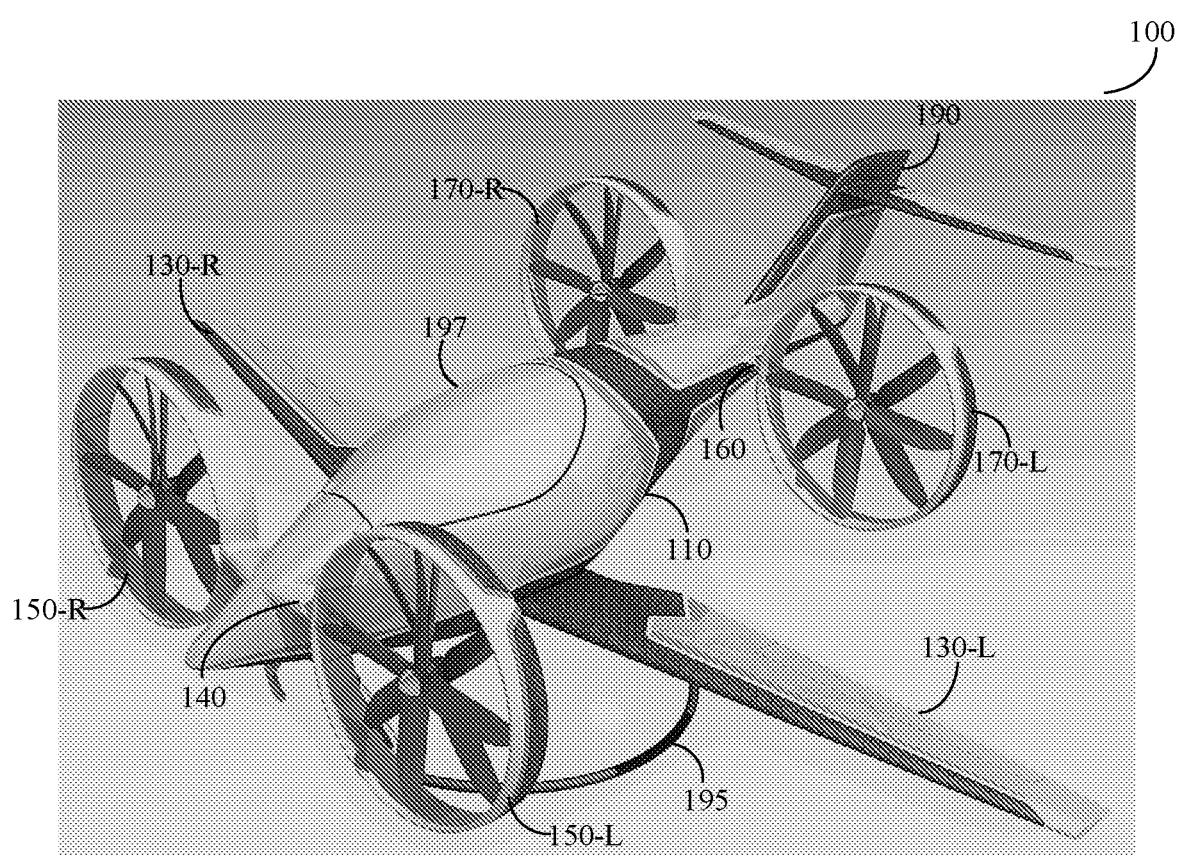
FIG. 1B—is a schematic diagram of the hybrid aerial vehicle (HAV) in a spread wings position and a vertical propellers position according to an embodiment.

FIG. 1B shows an exemplary and non-limiting schematic diagram of the hybrid aerial vehicle (HAV) 100 in a spread wings position and in a second propellers position according to an embodiment. The HAV 100 that is further described herein above with respect of FIG. 1 is disclosed herein in a spread wings position and in a second propellers position. The first wing 130-L is extended from a port side of the fuselage 110 and connected to the first mechanism 120 (shown in FIG. 1), and a second wing 130-R is extended from a starboard side of the fuselage 110 and connected to the first mechanism 120.

The first mechanism 120 allows coordinated contraction of the wings 130 essentially into the fuselage 110 such that tips of the wings 130 are positioned in proximity of the fuselage 110. According to an embodiment, during takeoff and landing the wings 130 are placed in a folded position, and the propellers 150 and the propellers 170 are positioned in a first plain that enables the HAV 100 to have enhanced maneuver capabilities. The first plain may be for example a horizontal position of the propellers with respect to the ground. In an embodiment, while landing or takeoff the HAV 100 uses a first flight mode that causes the wings 130 to fold and the propellers 150 and the propellers 170 to be positioned in a first plain, i.e. horizontal position. When the HAV 100 is in the first flight mode winds have less influence on the fuselage 110 of the HAV 100 and the propellers are more effective for takeoff or landing maneuvers. In order to improve efficiency of the propellers in both modes, hover when the wings are folded, and flight when the wings are spread, at least part of the propellers 150 and the propellers 170 may have variable pitch.

In an embodiment, during flight the HAV 100 uses a second flight mode that causes the wings 130 to spread and the propellers 150 and the propellers 170 to be positioned in a second plain. The second plain may be for example a vertical position with respect to the ground. When the HAV 100 is in the second flight mode the thrust of the propellers 150 and the propellers 170 is utilized to drive the HAV 100 towards the flight direction and the wings 130 enable the HAV 100 to have aerodynamic shape that allows the HAV 100 to fly faster and more effectively by consuming less energy.

Figure 1C:
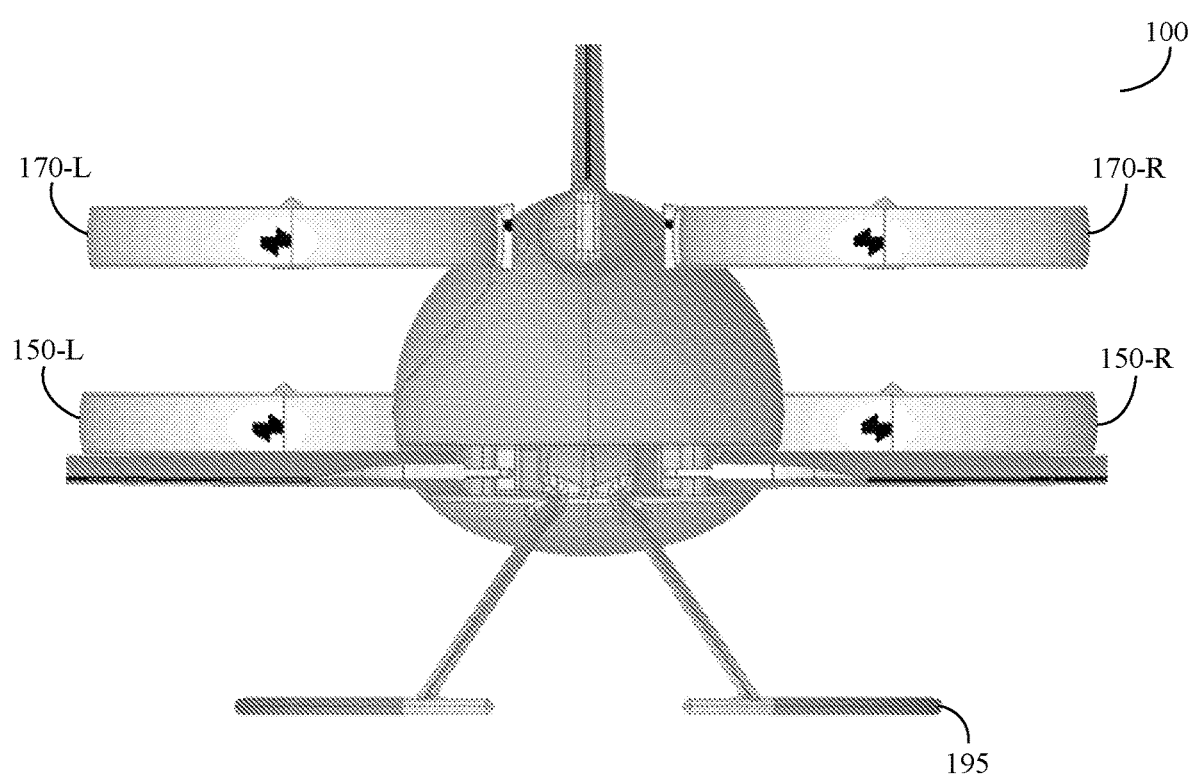
FIG. 1C—is a schematic diagram of the hybrid aerial vehicle (HAV) from a rear view according to an embodiment.

FIG. 1C shows an exemplary and non-limiting schematic diagram of the hybrid aerial vehicle (HAV) from a rear view according to an embodiment. The second mechanism (not shown) that is further discussed in FIG. 1A enables the propellers 150 to be positioned in a first vertical position on the fuselage 110. The third mechanism (not shown) places the plurality of propellers 170 affixed thereto to be at a second vertical position with respect to the propellers 150 affixed to the second mechanism. That is to say, the propellers 150 affixed to the second mechanism are placed in a different vertical position with respect to the vertical position at which the propellers 170 are placed. Positioning the propellers 150 and the propellers 170 in different vertical positions allows to improve the flight performances of the HAV 100 as the thrust of the propellers 150 does not interrupt the operation of the propellers 170.

Figure 2A:
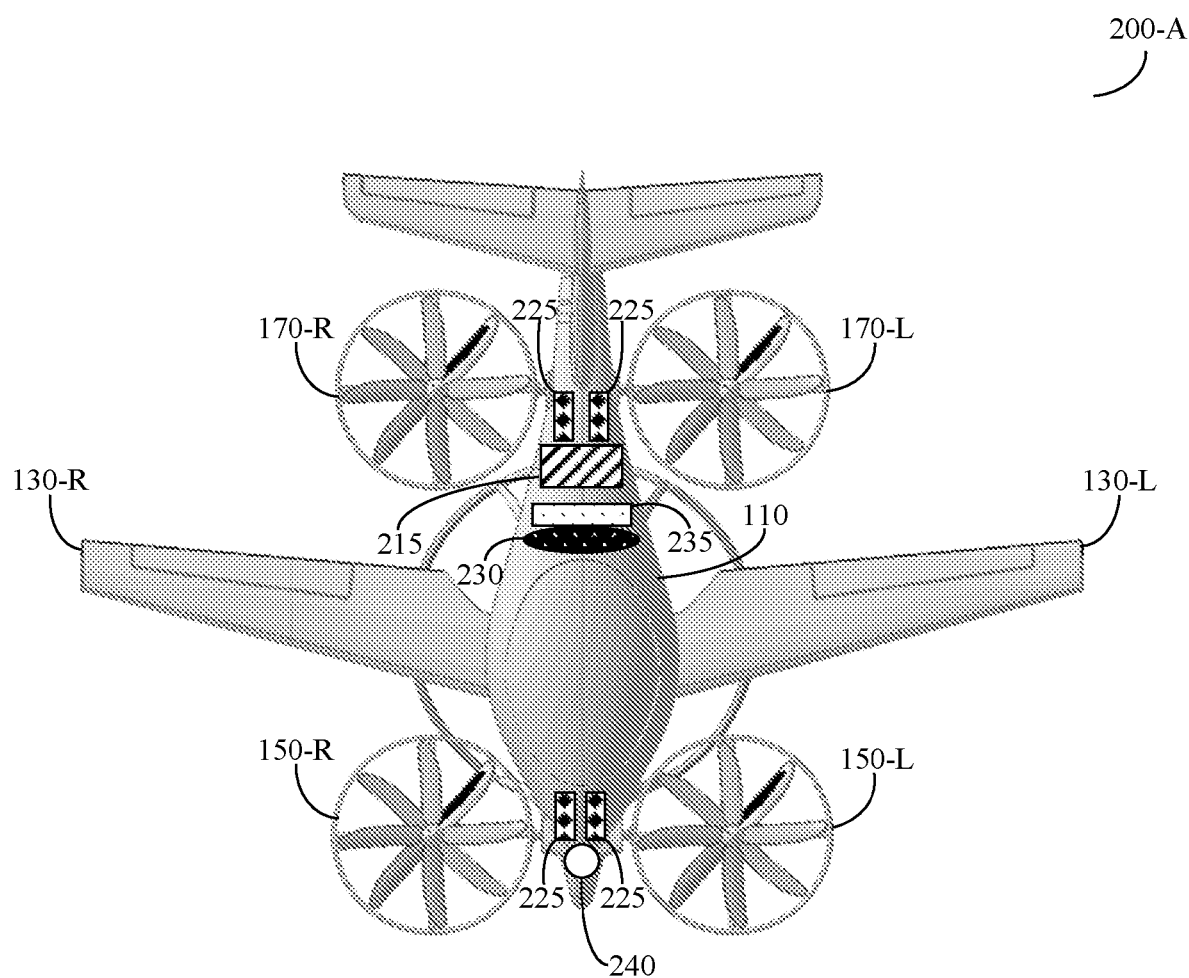
FIG. 2A—is a schematic diagram of a hybrid aerial vehicle (HAV) having a turboshaft engine for charging an electrical battery of the HAV according to an embodiment.

FIG. 2A shows an exemplary and non-limiting schematic diagram 200A of a hybrid aerial vehicle (HAV) having a turboshaft engine, for charging an electrical battery of the HAV according to an embodiment. The HAV 100 comprises a fuselage 110. The HAV 100 further comprises an electrical battery 215 mounted within the fuselage 110. The HAV 100 further comprises a plurality of propellers, such as, a first set of propellers 150-L affixed at the port side of the fuselage 110, a second set of propellers 150-R affixed at the starboard side of the fuselage 110.

The plurality of propellers further includes a third set of propellers 170-L affixed at the port side of the fuselage 110 and a fourth set of propellers 170-R affixed at the starboard side of the fuselage 110. Each propeller is driven by a respective electrical engine 225. Each electrical engine 225 receives electrical power from the electrical battery 215.

The HAV 100 further comprises a turboshaft engine 230 placed within the fuselage 110, adapted to generate an electric current for the purpose of charging the electrical battery 215. The turboshaft engine 230 is electrically connected to the electrical battery 215 for the purpose of charging the electrical battery 215.

The HAV 100 further comprises a gasoline chamber 235 connected to the turboshaft engine 230 for supply of gas during operation of the turboshaft engine 230. The HAV 100 further comprises a control unit 240 that is connected to at least the turboshaft engine 230 and configured to start or shut off the turboshaft engine 230. The control unit 240 may control the operation of the turboshaft engine 230 upon identification of real time parameters such as altitude, speed, location, flight plan, etc.

For example, the control unit 240 may identify that the HAV 100 is currently at 5 feet high and according to the flight plan it seems that the HAV 100 just took off. Therefore, the control unit 240 keeps the turboshaft engine 230 off until the HAV 100 reaches a 200 feet high altitude and then the control unit 240 activates the turboshaft engine 230 for charging the electrical battery 215.

In order to identify the location of the HAV 100 at real time, the HAV 100 may use a global positioning system (GPS) and/or other means such as communication-based positioning, radar-based systems, and so on. The HAV 100 may further comprises a plurality of sensors such as, an airspeed sensor, an altitude meter, etc. for determining the altitude, speed, etc. of the HAV 100.

According to an embodiment the HAV 100 further comprises a plurality of wings 130 such as a first wing 130-L that is extended from a port side of the fuselage 110 and connected to a first mechanism 120, and a second wing 130-R that is extended from a starboard side of the fuselage 110 and connected to the first mechanism 120. The first mechanism allows coordinated contraction of the plurality of wings 130 essentially into the fuselage 110 such that tips of the wings 130 are positioned in proximity of the fuselage 110 and coordinated extension of the wings 130 such that tips of each wing 130 are positioned away from the fuselage 110.

The purpose of this disclosure is to enable the HAV 100 to cover long distance without recharging the electrical battery 215 frequently. Additional key advantage of thus disclosure is the ability to control the noise produced by the HAV 100 using the control unit 240 for determining whether it is appropriate to activate the turboshaft engine 230 in certain situations.

Figure 2B:
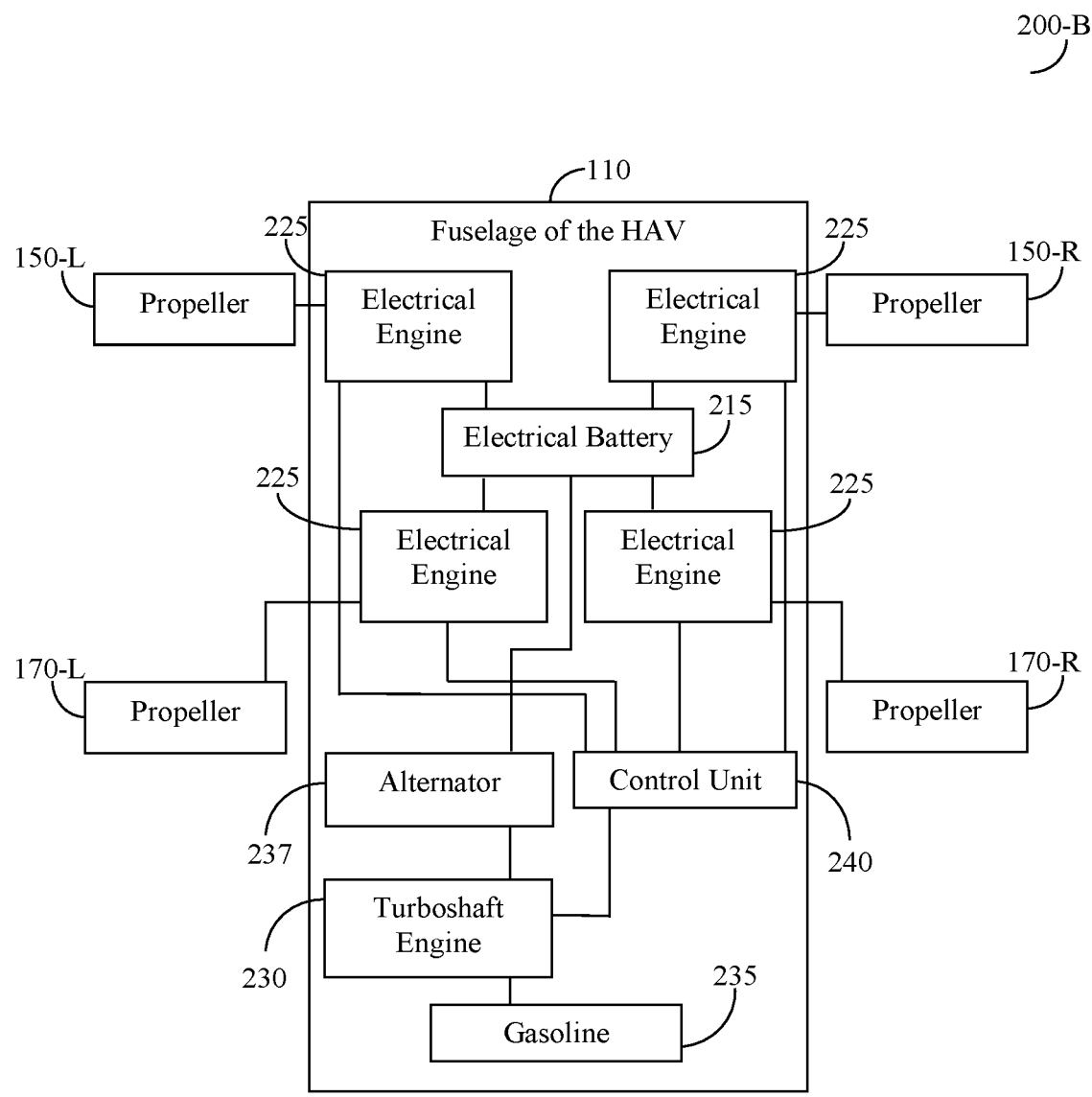
FIG. 2B—is a schematic block diagram of a hybrid aerial vehicle (HAV) having a turboshaft engine for charging an electrical battery of the HAV according to an embodiment.

FIG. 2B depicts an exemplary and non-limiting schematic block diagram of a hybrid aerial vehicle (HAV) having a turboshaft engine for charging an electrical battery of the HAV according to an embodiment. The HAV 100 comprises a fuselage 110. The HAV 100 further comprises an electrical battery 215 mounted within the fuselage 110. The HAV 100 further comprises a plurality of propellers, such as, a first set of propellers 150-L affixed at the port side of the fuselage 110, a second set of propellers 150-R affixed at the starboard side of the fuselage 110.

The plurality of propellers further includes a third set of propellers 170-L affixed at the port side of the fuselage 110 and a fourth set of propellers 170-R affixed at the starboard side of the fuselage 110. Each propeller is driven by a respective electrical engine 225. Each electrical engine 225 receives electrical power from the electrical battery 215. In an embodiment, the HAV 100 may include a plurality of electrical batteries such as the electrical battery 215.

The HAV 100 further comprises a turboshaft engine 230 placed within the fuselage 110, adapted to generate an electric current for the purpose of charging the electrical battery 215. The turboshaft engine 230 is electrically connected to the electrical battery 215 through a dedicated alternator 237, for the purpose of charging the electrical battery 215. The HAV 100 further comprises a gasoline chamber 235 connected to the turboshaft engine 230 for supply of gas during operation of the turboshaft engine 230.

The HAV 100 further comprises a control unit 240 that is connected to at least the turboshaft engine 230 and configured to start or shut off the turboshaft engine 230. The control unit 240 may control the operation of the turboshaft engine 230 upon identification of real time parameters such as altitude, speed, location, flight plan, etc. According to further embodiment, the control unit 240 is communicatively connected to each electrical engine 225 and configured to control the operation of each electrical engine 225.

According to another embodiment, charging the electrical battery, and\or directly supplying the electric power to the electric motors during flight or in flight and hover, may be achieved by using a fuel cell system (not shown). The fuel cell system may comprise a hydrogen tank connected to a fuel cell stack. The fuel cell stack receives hydrogen from the hydrogen tank using at least one pipe. The fuel cell stack is connected to and controlled by a fuel cell control unit that controls the operation of the fuel cell system. The fuel cell system further comprises a power regulator connected to at least one electrical battery such as the electrical battery 125. The power regulator is further connected to a plurality of electrical drivers that route the power to a plurality of electrical engines such as the electrical engine 225. Each electrical engine 225 drives at least one of the propellers of the HAV 100.

According to another embodiment, instead of carrying a hydrogen tank, the hydrogen supply may be achieved by producing it, on the HAV 100 using a catalyzer (not shown) that produces hydrogen by mixing water and aluminum, or any other material that can be used instead. In an embodiment, the materials may be stored in two different tanks, one containing water, and one containing aluminum, or any other material that can be used instead. According to another embodiment, the materials may be stored in one tank that is fueled by a pre-mixed solution of water and aluminum, or any other material that can be used instead.

Figure 3:
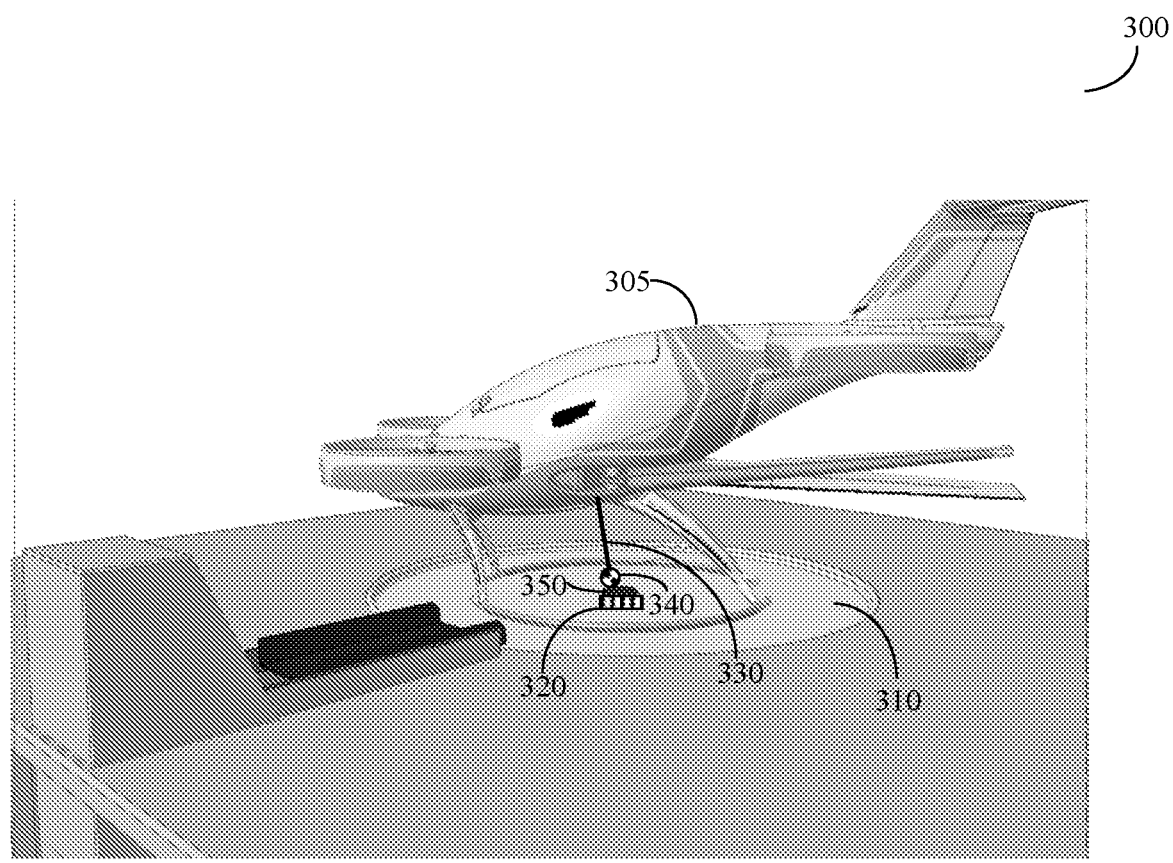
FIG. 3—is a schematic diagram of a landing system for an unmanned aerial vehicle (UAV) according to an embodiment.

FIG. 3 depicts an exemplary and non-limiting schematic diagram of a landing system 300 for an unmanned aerial vehicle (UAV) according to an embodiment. The landing system 300 comprises a landing platform 310. The landing platform 310 is a surface designed to accept at least a UAV 305 such as the hybrid aerial vehicle (HAV) 100. The landing platform 310 may be affixed to a roof of, for example, a mail unit, a delivery warehouse, etc. for enabling loading and unloading the UAV 305 with packages, mail items such as letters, registered mail, etc. In an embodiment, the landing platform 310 may be placed on the ground.

The landing system 300 further comprises a pulley mechanism 320 affixed to the landing platform 310. The pulley mechanism 320 may be for example a winch that is designed to accept a cable 330 delivered from the UAV 305. The cable 330 comprises at least a ferromagnetic material 340, such as Nickel (Ni) at the cable end.

The landing system 300 further comprises an electromagnet 350 affixed to the landing platform 310. The electromagnet 350 is triggered when the cable 330 is delivered from the UAV 305 towards the landing platform 310. Thus, after the cable 330 is having a magnetic contact with the electromagnet 350, the pulley mechanism 320 may be activated, that is, turn, and thereby pull the UAV 305 towards the landing platform 310. In an embodiment the pulley mechanism 320 is design for rewinding the cable 330 back onto the UAV 305. The pulley mechanism 320 may rewind the cable 330 by performing an opposite turn from the side it turned when pulling the UAV 305 towards the landing platform 310.

According to another embodiment, the landing system 300 further comprises at least one capturing device (not shown), such as, a camera installed on the landing platform 310 that enables to identify the UAV 305 when the UAV 305 approaches the landing platform 310. According to another embodiment, the landing system 310 may include a pointer element (not shown) designed to facilitate the identification of the landing platform 310 when it is searched by a capturing device installed on the UAV 305.

According to another embodiment, the landing system 300 comprises a control unit (not shown) embedded therein. The control unit may be connected to the at least one camera, the pointer element, the pulley mechanism 320, etc. The control unit may be configured to control the operation of the pulley mechanism 320 based on the determination that the ferromagnetic material 340 has been connected to the electromagnet 350. That is to say, the control unit may cause the pulley mechanism 320 to turn and therefore the pulley mechanism 320 pulls the UAV 305 towards the landing platform 310.

In yet further embodiment, the landing system 300 may comprise a differential global positioning system (DGPS), or Relative GPS (RGPS) providing improved location accuracy. The DGPS or RGPS may be connected to the control unit such that when GPS signals are received from the UAV 305, by a global positioning system (GPS) installed thereon, the DGPS or RGPS allows to determine an accurate location of the UAV 305. Therefore, the DGPS or RGPS assist the UAV 305 to navigate to the landing system 300 in improved accuracy.

The purpose of this disclosure is to assist UAVs perform a safe and accurate landing that overcomes bad weather, strong wings, software errors during landing, and so on. For example, when the cable 330 is attached to the pulley mechanism 320, the UAV 305 is pulled down accurately towards the landing platform 310.

Figure 4A:
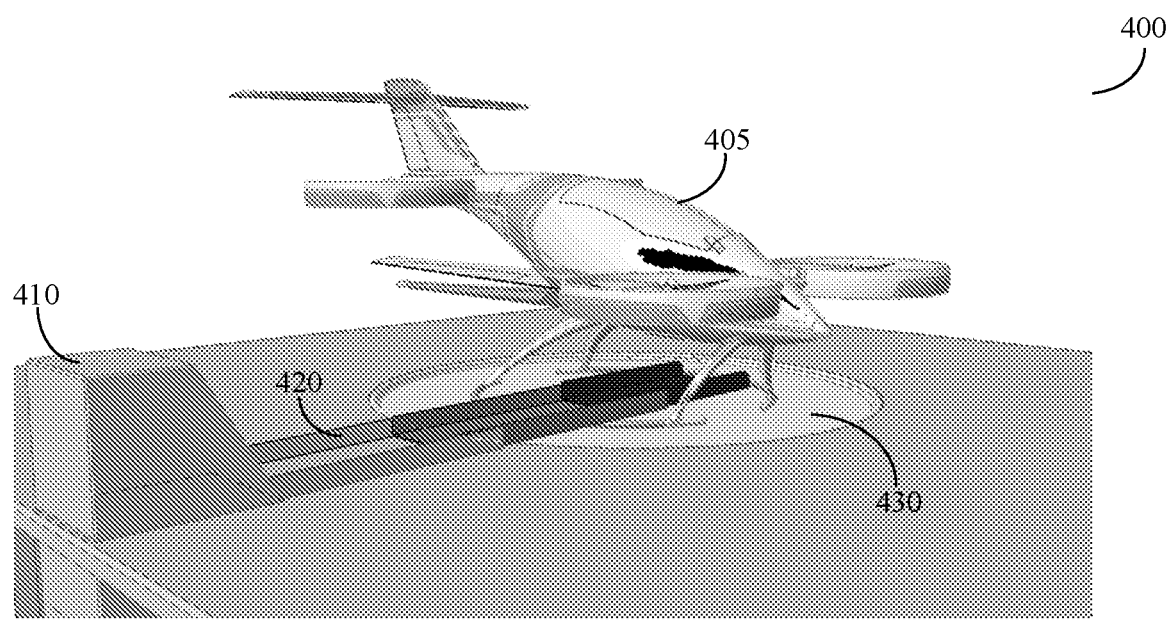
FIG. 4A—is a schematic diagram of a delivery system for an unmanned aerial vehicle (UAV) according to an embodiment.

FIG. 4A depicts an exemplary and non-limiting schematic diagram of a delivery system 400 for an unmanned aerial vehicle (UAV) 405 according to an embodiment. The delivery system 400 comprises a delivery chute 410 adapted to be mounted on a top surface of a delivery warehouse. The delivery chute 410 is adapted to accept one or more items such as packages, registered mail, etc. delivered by the UAV 405. The delivery warehouse may be configured to store therein the items received from the delivery chute 410. The delivery system 400 further comprises a roller ramp 420. The roller ramp 420 is extendable away from the delivery chute 410, designed to drive at least one item towards the delivery chute 410, and mounted adjacent to the delivery chute 410. In an embodiment, the roller ramp 420 consists of a plurality of segments that enable the roller ramp 420 to have extending capabilities.

The delivery system 400 further comprises a rotating landing platform 430 mounted on the top surface of the delivery warehouse. The rotating landing platform 430 is designed to enable an aerial vehicle such as the UAV 405 to land thereon in any angle with respect of the roller ramp 420 that is designed to receive the items carried by the UAV 405. That is to say, the UAV 405 is not required to land in a particular angle with respect of the roller ramp 420, as the rotating landing platform 430 is designed to rotate and therefore, place the UAV 405 in an optimal unloading position after the UAV 405 lands on the rotating landing platform 430.

According to one embodiment, after the UAV 405 lands on the rotating landing platform 430 the rotating landing platform 430 rotates to an unloading position with respect of the roller ramp 420. Thereafter the roller ramp 420 extends towards the UAV 405 over the rotating landing platform 430 and positioned with respect of the UAV 405 for receiving items from the UAV 405 by the roller ramp 420. According to one embodiment the roller ramp 420 may be positioned beneath at least one hatch of the at least one cargo pod of the UAV 405, such that when the at least one hatch is opened the items descend from the at least one cargo pod towards the roller ramp 420.

According to an embodiment, the delivery system 400 further comprises a control unit designed to control the operation of the components of the delivery system 400. As a non-limiting example, the control unit may be connected to the roller ramp 420 and manage the placement of the roller ramp 420 with respect of the UAV 405 for receiving items from the UAV 405 by the roller ramp 420. According to another example, the control unit may control the rotating landing platform 430 and rotate the rotating landing platform 430 to an optimal position with respect of the position of the roller ramp 420 for unloading the items carried by the UAV 405.

Figure 4B:
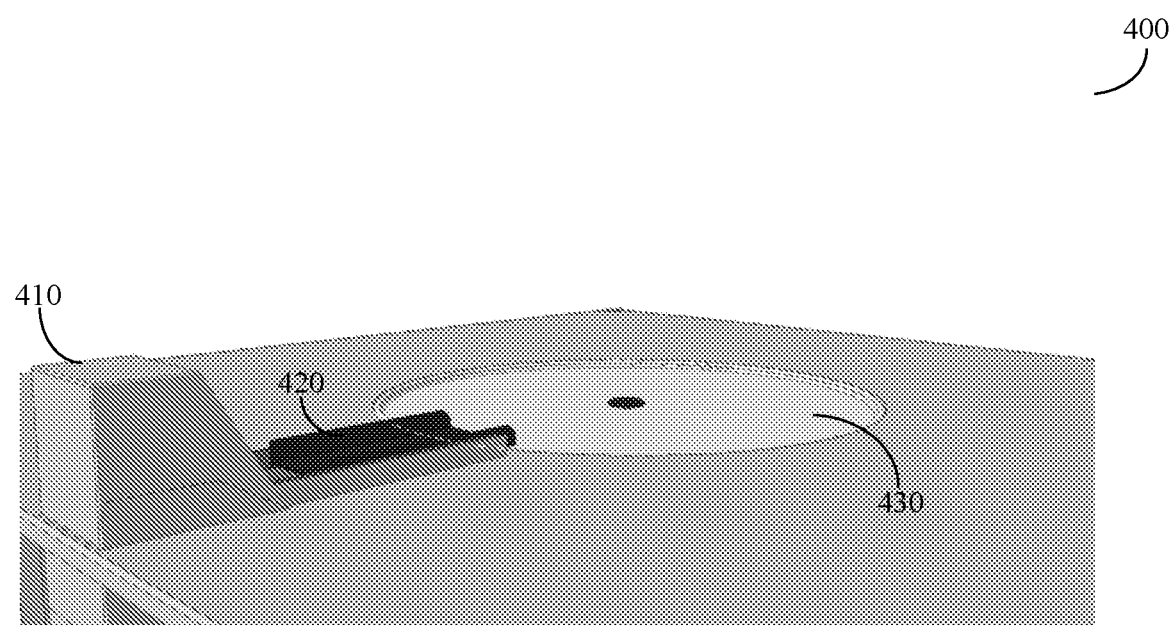
FIG. 4B—is a schematic diagram of a delivery system for an unmanned aerial vehicle (UAV) in a folded position according to an embodiment.

FIG. 4B depicts an exemplary and non-limiting schematic diagram of a delivery system 400 for an unmanned aerial vehicle (UAV) in a folded position according to an embodiment. The delivery system 400 comprises a roller ramp 420 having a plurality of positions, such as a first position and a second position. The first position may be a folded position in which a plurality of segments of the roller ramp 420 are folded towards the delivery chute 410. At the second position, at least part of the plurality of segments of the roller ramp 420 are spread towards the rotating landing platform 430.

Figure 5A:
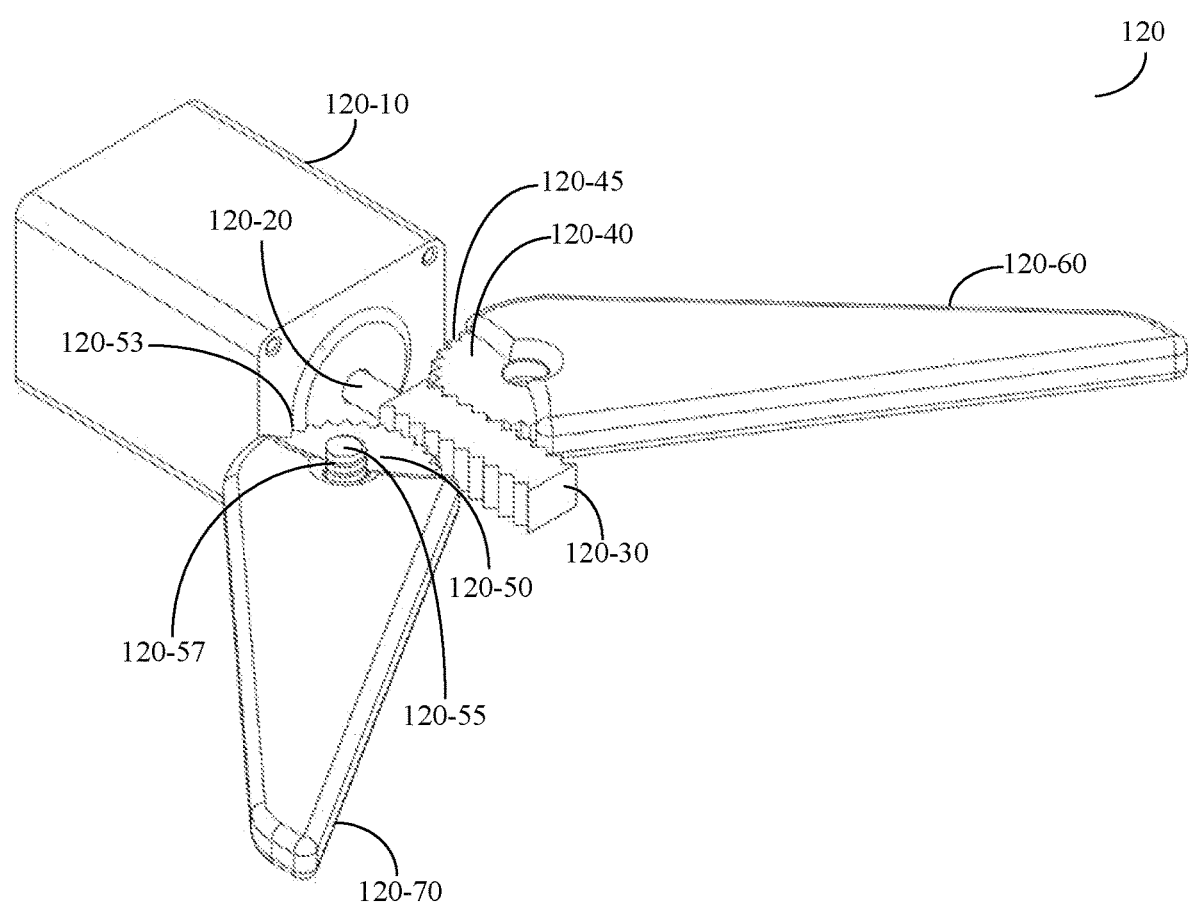
FIG. 5A—is a schematic diagram of a mechanism for folding and unfolding a first wing and a second wing of a hybrid aerial vehicle (HAV), at an unfolded position.
Figure 5B:
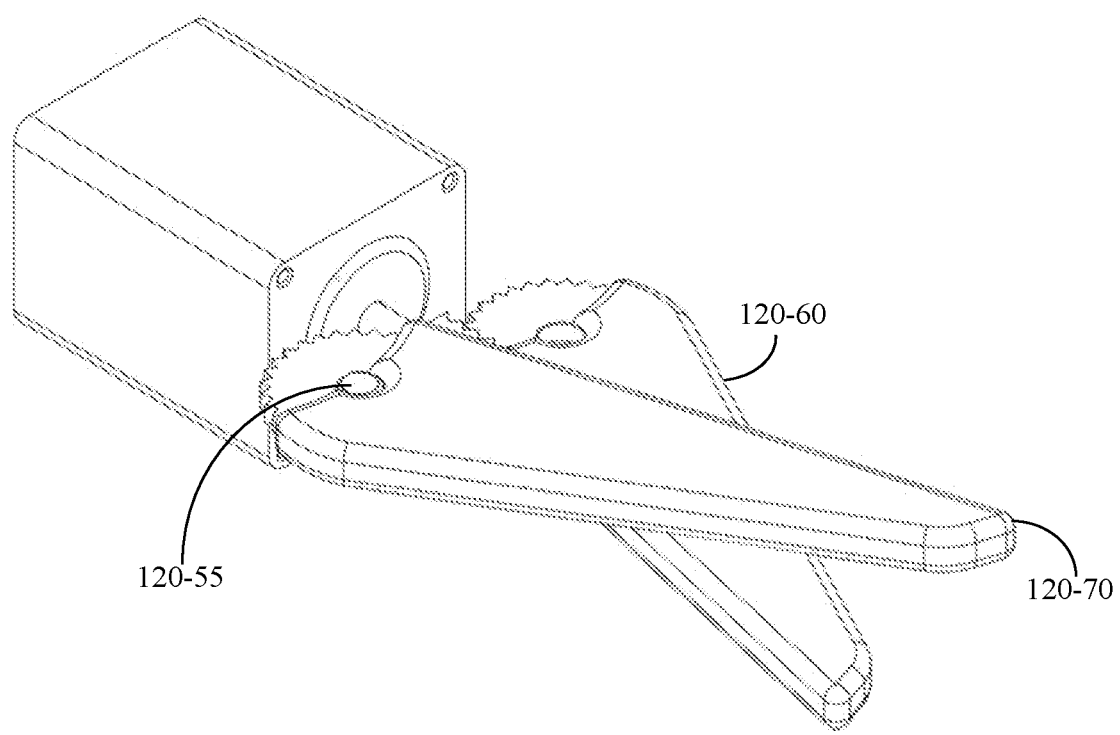
FIG. 5B—is a schematic diagram of a mechanism for folding and unfolding a first wing and a second wing of a hybrid aerial vehicle (HAV), at a folded position.
Figure 5C:
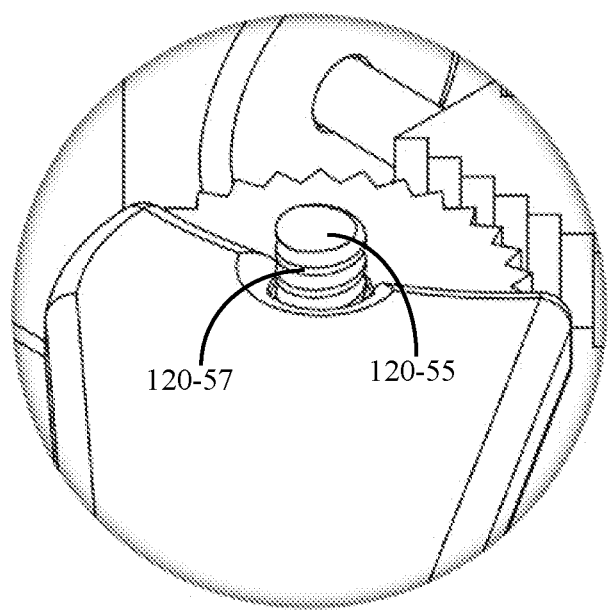
FIG. 5C—is a schematic diagram of a screw having a spiral groove allowing a wing of the hybrid aerial vehicle (HAV) to be positioned in a first plain and in a second plain.

FIG. 5A-5C depicts an exemplary and non-limiting schematic block diagram of a first mechanism 120 for folding and unfolding a first wing and a second wing of a hybrid aerial vehicle (HAV) at an unfolded position of the wings according to an embodiment. The first wing 120-60 and the second wing 120-70 are on a first plain at an unfolded position of opposite sides of the HAV 100. The first wing 120-60 is on the first plain and the second wing 120-70 on a second plain at a folded position as shown in FIG. 5B.

According to an embodiment the first mechanism 120 comprises a motor 120-10 such as a servo motor, that is configured to create the necessary motion for allowing the wings to fold and unfold as further described herein below. The first mechanism 120 further comprises a shaft 120-20 extending from the motor 120-10 having a rotational movement by the motion of the motor 120-10. At the edge of the shaft 120-20 there are a plurality of conical grooves 120-30.

The first mechanism 120 further comprises a first gear 120-40 affixed to the first wing 120-60 having at least a cogwheel 120-45 having teeth fitting the plurality of conical grooves 120-30.

The first mechanism 120 further comprises a screw 120-55 affixed to the second wing 120-70 having a spiral groove 120-57. The spiral groove 120-57, also shown in FIG. 5C, enables the second wing 120-70 to be positioned in a first plain and in a second plain based on the rotation of the motor 120-10.

The first mechanism 120 further comprises a second gear 120-50 positioned on the screw 120-55 and having at least a cogwheel 120-53 having teeth fitting the plurality of conical grooves 120-30.

According to an embodiment, upon rotation of the motor 120-10 in a first direction the second wing 120-70 moves from the first plain to the second plain. According to another embodiment, upon rotation of the motor 120-10 in a second direction the second wing 120-70 moves from the second plain to the first plain adhering to the spiral groove 120-55 of the screw.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A hybrid aerial vehicle (HAV) comprising:
   a fuselage of the HAV having;
   a first mechanism within the fuselage for accepting a plurality of wings of the HAV, the first mechanism allowing (a) coordinated contraction of the plurality of wings essentially into the fuselage such that tips of the wings are positioned in proximity of the fuselage and (b) coordinated extension of the wings such that tips of each wing are positioned away from the fuselage;
   a first wing extending from the port side of the fuselage and connected to the first mechanism;
   a second wing extending from the starboard side of the fuselage and connected to the first mechanism;
   a second mechanism placed within the fuselage in proximity to its front end, the second mechanism allowing motion of propellers of the HAV affixed there to between a first plane and a second plane;
   a first set of propellers affixed at the port side of the fuselage to the second mechanism;
   a second set of propellers affixed at the starboard side of the fuselage to the second mechanism;
   a third mechanism placed within the fuselage in proximity to its rear end, the third mechanism allowing motion of propellers of the HAV affixed there to between a first plane and a second plane, and further placing the propellers affixed thereto to be at a vertical displacement with respect to the propellers affixed to the second mechanism;
   a third set of propellers affixed at the port side of the fuselage to the third mechanism; and
   a fourth set of propellers affixed at the starboard side of the fuselage to the third mechanism.

2. The hybrid aerial vehicle of claim 1, comprising a mechanism adapted to move the wings, such that they do not interfere with the operation of the propellers.

3. A mechanism for moving the wings of a hybrid aerial vehicle from a folded position to an extended position, and for folding said wings when in extended position, comprising:
   a) two wings, each provided with a teethed gear connected thereto at the end proximal to the mechanism, wherein one of said wings is elevatable when rotating around the axis of its teethed gear;
   b) a motor provided with a shaft rotatable thereby;
   c) engagement teeth provided at the distal end of said shaft or close thereto, adapted to engage the gears of said wings; and
   d) a screw or the like extended shaft, provided with a spiral groove, in contact with the elevatable wing;

whereby the rotation of the motor shaft elevates the elevatable wing to a plane higher than that of the open position, while concurrently moving both wings one toward the other to a folded position.

4. The mechanism of claim 3, which is adapted to operate when the hybrid aerial vehicle is airborne.

5. The mechanism of claim 3, wherein the two wings are located on the same plane when in extended position.

6. The mechanism of claim 3, wherein the screw or the like extended shaft is provided with a gear positioned thereon.

7. The mechanism of claim 6, wherein the gear comprises a cogwheel.

\* \* \* \* \*